United States Patent
Mason et al.

(10) Patent No.: US 7,229,514 B2
(45) Date of Patent: Jun. 12, 2007

(54) METHOD OF MAKING CURVED HOSE

(75) Inventors: Peter Donald Mason, Collingwood (CA); Charles Frederick Bender, Meaford (CA); Tony John Kotsos, Collingwood (CA); Richard Vitai Huynh, Wasaga Beach (CA); Arthur Joseph Culham, Nottawa (CA)

(73) Assignee: The Goodyear Tire & Rubber Company, Akron, OH (US)

( * ) Notice: Subject to any disclaimer, the term of this patent is extended or adjusted under 35 U.S.C. 154(b) by 504 days.

(21) Appl. No.: 10/764,778

(22) Filed: Jan. 26, 2004

(65) Prior Publication Data

US 2004/0154732 A1 Aug. 12, 2004

Related U.S. Application Data

(60) Provisional application No. 60/445,670, filed on Feb. 7, 2003.

(51) Int. Cl.
*B29C 53/08* (2006.01)

(52) U.S. Cl. .................. 156/149; 156/221; 156/307.3; 156/307.5; 156/333

(58) Field of Classification Search ................ 156/148, 156/149, 307.5, 333, 335, 910
See application file for complete search history.

(56) References Cited

U.S. PATENT DOCUMENTS

| | | | | |
|---|---|---|---|---|
| 2,525,662 | A | * 10/1950 | Freeman | 137/312 |
| 2,984,262 | A | * 5/1961 | Aymami et al. | 138/126 |
| 3,060,078 | A | 10/1962 | Atwell | 156/335 |
| 3,972,757 | A | 8/1976 | Derderian et al. | 156/143 |
| 4,242,296 | A | 12/1980 | Bricker | 264/149 |
| 5,196,258 | A | 3/1993 | Keller et al. | 428/224 |
| 5,236,742 | A | 8/1993 | Sekigushi et al. | 427/389.7 |
| 5,654,099 | A | * 8/1997 | Pelton | 428/378 |
| 5,683,773 | A | 11/1997 | Kemper | 428/36.91 |
| 5,717,031 | A | 2/1998 | Degen et al. | 525/129 |
| 5,807,634 | A | 9/1998 | Pelton | 428/378 |
| 6,142,189 | A | 11/2000 | Bhattacharyya | 138/177 |
| 6,464,916 | B2 | 10/2002 | Tyson | 264/150 |
| 2002/0079608 | A1* | 6/2002 | Tyson | 264/150 |
| 2002/0171175 | A1* | 11/2002 | Ainsworth et al. | 264/339 |
| 2003/0026931 | A1 | 2/2003 | Bhattacharyya | 428/36.9 |

FOREIGN PATENT DOCUMENTS

WO  WO 96/00657  1/1996

OTHER PUBLICATIONS

D.C. Miles J.H. Briston: "Technologie des polyméres" 1968, Dunod, Paris, XP002279008, pp. 154-155.

* cited by examiner

*Primary Examiner*—Geoffrey L. Knable
(74) *Attorney, Agent, or Firm*—John D. DeLong

(57) ABSTRACT

The present invention is directed to a method for manufacturing a curved hose. The method is comprised of the steps of (a) forming a hose assembly, the hose assembly comprising: (i) an innermost layer of a halogenated polyolefin rubber; (ii) a polyester reinforcement overlaying the innermost layer, the reinforcement having disposed on its surface an RFL adhesive comprising a chlorosulfonated polyethylene rubber; and (iii) an elastomeric cover overlaying the braided reinforcement; (b) cutting the hose assembly into hose lengths; (c) shaping the hose lengths into predetermined curved hose shapes; and (d) curing the curved hose shapes.

16 Claims, 2 Drawing Sheets

METHOD OF MAKING CURVED HOSE

This application claims the benefit of U.S. Provisional Application No. 60/445,670, filed Feb. 7, 2003.

FIELD

The present invention is directed towards a method for manufacturing hoses. More specifically, the present invention is directed towards a method for manufacturing finite length curved hoses.

BACKGROUND

Rubber hoses of curved shape are required in a variety of applications. Curved or formed hoses are recognized as hoses of finite length, having been shaped along their length to adapt to the particular hose application. Typical examples of applications for curved hoses is in automotive radiators, transmission oil coolers, braking systems, engine oil coolers, power steering systems, and fuel systems. The hoses are curved, or formed, into the shape dictated by the design of the automobile engine compartment, for example, to fit or conform into the area where the hose is to be used. Typically curved hoses may be manufactured by extruding a rubber core layer, applying a reinforcement layer over the core layer, and extruding a cover layer over the reinforcement layer to form an indefinite length hose. The uncured or partially cured hose length is cut to finite lengths and may be placed manually on rigid mandrels having the shape of the desired finished hose configuration. The mandrels and the uncured hose assemblies are placed in vulcanization units. The lengths of hose are vulcanized on the mandrels in the desired configuration. The finished hoses are removed from the mandrels.

This conventional method of manufacturing curved hoses is very labor-intensive. The desired final hose configuration often requires three-dimensional routing of the hose length. The hose lengths are manually inserted onto and removed from the rigid mandrels. For complex curved hoses, more than one person is often required to insert and remove the hose lengths on and off of the rigid mandrels. While mandrel lubricants are employed, loading and unloading the hose may cause the interior walls of the hoses to rip or tear.

One manifestation of the difficulty in manufacturing curved hoses is the level of adhesion of the reinforcement to the innermost rubber core layer and to the rubber cover. During loading and unloading of the hose on the rigid mandrels, the layers may move relative to one another, leading to poor adhesion and ultimately delamination during production, storage or use of the hose. If steam vulcanization is used, steam may migrate between the hose layers along the length of the hose, interfering with the formation of adequate bonding between the layers. In an effort to improve the adhesion between the reinforcement and rubber layers, polyester reinforcement may be pretreated with an isocyanate material. The hose may be partially cured before cutting and placing on the mandrel. The partial curing is intended to impart some degree of bonding between the hose layers, to resist separation or tearing during the shaping process. Finally, the hose ends may be capped with elastic or metallic bands to resist the migration of steam between the hose layers during vulcanization.

Prior art methods for making curved hoses are disclosed in U.S. Pat. Nos. 6,464,916 and 4,242,296 and Japanese Publications 5200900, 4250025, and 4339638. The use of end caps to prevent migration of steam into hose is disclosed in U.S. Pat. No. 3,972,757.

U.S. Pat. No. 5,807,634 discloses a method for improving the adhesion of alkylated chlorosulfonated polyethylene and chlorosulfonated polyethylene rubber to a polyester reinforcement treated with an RFL comprising chlorosulfonated polyethylene.

SUMMARY

The present invention is directed to a method for manufacturing a curved hose, the method comprising the steps of:
(a) forming a hose assembly, the hose assembly comprising:
(b) (i) an innermost layer of a halogenated polyolefin rubber;
(ii) a polyester reinforcement overlaying the innermost layer, the reinforcement having disposed on its surface an RFL adhesive comprising a chlorosulfonated polyethylene rubber; and
(iii) an elastomeric cover overlaying the reinforcement;
(b) cutting the hose assembly into hose lengths;
(c) shaping the hose lengths into predetermined curved hose shapes; and
(d) curing the curved hose shapes.

BRIEF DESCRIPTION OF THE DRAWINGS

The invention will be described by way of example and with reference to the accompanying drawings in which.

DESCRIPTION

Figure 1:
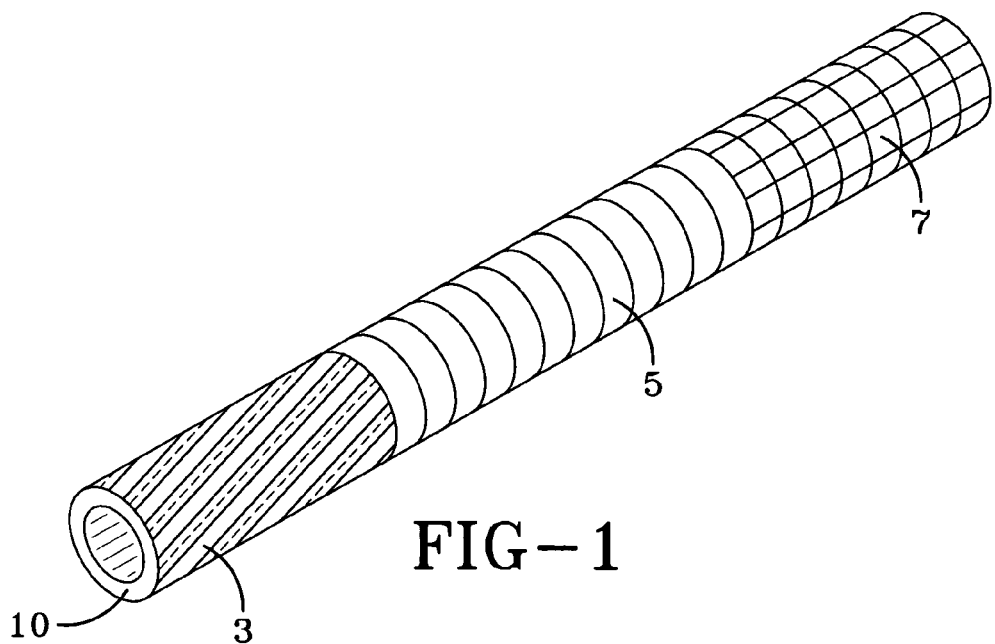
FIG. 1 illustrates a cross section of the hose assembly.

When a hose (10), for example, as shown in FIG. 1 is produced, the hose includes the an innermost layer (3) of a halogenated polyolefin rubber; a polyester reinforcement overlaying the innermost layer, the reinforcement having disposed on its surface an RFL adhesive comprising a chlorosulfonated polyethylene rubber; and an elastomeric cover overlaying the reinforcement.

Suitable halogenated polyolefin rubbers for use in the hose include chlorosulfonated polyethylene, alkylated chlorosulfonated polyethylene, and chlorinated polyethylene.

Chlorinated polyethylene starting materials suitable for purposes of the present invention include but are not limited to finely-divided particles which typically meet four physical property criteria. First, the materials have a weight average molecular weight of from about 40,000 to about 300,000. Second, the materials have a chemically combined chlorine content of from about 20 to about 48 percent by weight of polymer. Third, the materials have a 100 percent modulus, measured in accordance with ASTM Test D-412, from about 0.5 to about 4.8 MPa. Fourth, the materials have a heat of fusion of from about 0 to about 15 calories per gram, preferably from about 0 to about 10 calories per gram. Commercially available chlorinated polyethylenes that are suitable for use in the present invention include, but are not limited to, those obtained from DuPont/Dow under the designation Tyrin™ 3611P and Tyrin™ CM0136.

The chlorosulfonated polyethylene materials useful in this invention include, but are not limited to, a material having from about 20 to about 48 weight percent chlorine, and from about 0.4 to about 3.0 weight percent sulfur. Typical preparations of chlorosulfonated polyethylene are disclosed in U.S. Pat. No. 2,586,363 and U.S. Pat. No. 2,503,252. Commercially available chlorosulfonated polyethylenes which may be used in the present invention include, but are not limited to, those obtained from E I DuPont de Nemours, Inc, under the designation Hypalon®, such as Hypalon® 20, Hypalon® 40, Hypalon® 40 Soft, Hypalon® 4085 and Hypalon® HPG 6525.

The innermost layer (3) may be formed by extrusion methods known to those skilled in the art. The thickness of this innermost layer (3) is important as excessively thin wall thicknesses or excessively thick wall thicknesses present flexibility or kinking problems or coupling compatibility problems of the final hose composite. It is believed that the inside diameter of the innermost layer (3) should range from 4 mm to 456 mm. Preferably, the inside diameter of the innermost layer will range from 6 mm to 102 mm. The wall thicknesses of the innermost layer (3) should range from 0.5 mm to 8.0 mm, with a range of from 1.2 mm to 4.0 mm being preferred.

In addition to the halogenated polyolefin, the innermost layer (3) composition may contain conventional additives including reinforcing agents, fillers, peptizing agents, pigments, stearic acid, accelerators, crosslinking agents, antiozonants, antioxidants, processing oils, activators, initiators, plasticizers, waxes, pre-vulcanization inhibitors, extender oils and the like. Representative of reinforcing agents include carbon black, which is typically added in amounts ranging from about 5 to 200 parts by weight based on 100 parts by weight of total rubber (phr). Preferably, carbon black is used in amounts ranging from about 35 to 120 phr. Typical carbon blacks that are used include N110, N330, N332, N472, N550, N630, N642, N650, N762, N770, N907, N908, N990 and N991. In those instances, when the hose will be used to convey flammable fluids, electrically conductive blacks may be used. Non-carbon black fillers which may be used include talc, clay, calcium carbonate, silica and the like. Non-carbon black fillers, such as silica, may be used in an amount ranging from about 5 to 150 phr. The preferred non-carbon black filler is silica. Oil dispersions containing such fillers may also be used. Organosilanes such as 3,3' bis(triethoxysilylpropyl)tetrasulfide may be used in amounts ranging from 0.1 to 20 phr. Suitable examples of such organosilanes are disclosed in U.S. Pat. No. 4,128,438 incorporated herein by reference in its entirety. Representative of the antidegradants which may be in the composition include microcrystalline wax, paraffinic wax, monophenols, bisphenols, thiobisphenols, polyphenols, hydroquinone derivatives, phosphites, phosphate blends, thioesters, naphthylamines, diphenol amines, substituted and unsubstituted diaryl amine derivatives, diarylphenylenediames, para-phenylene diamines, quinolines and blended amines. Antidegradants are generally used in an amount ranging from about 0.1 phr to about 10 phr with a range of from about 2 to 6 phr being preferred. Representative of processing aids which may be used in the rubber composition of the present invention include activated dithio-bisbenzanilide, poly-para-dinitrosobenzene, xylyl mercaptans, aliphatic-naphthenic aromatic resins, polyethylene glycol, calcium stearamide, petroleum oils, vulcanized vegetable oils, pine tar, phenolic resins, synthetic oils, petroleum resins, polymeric esters and rosins. These processing oils may be used in a conventional amount ranging from about 0 to about 140 phr. Representative of initiators that may be used is stearic acid. Initiators are generally used in a conventional amount ranging from about 1 to 4 phr. Additional additives which may be used as part of the cure package include calcium oxide, zinc oxide and magnesium oxide. These additives are conventionally used in amounts ranging from 0.1 to 25 phr. Crosslinkers such as triallylisocyanurate and triazine-based materials may be used in amounts ranging from 0.25 to 6 phr.

The peroxide useful in the composition are those that are normally used in the industry. For example, peroxides such as dicumyl peroxide, [a,a'-bis(t-butylperoxide)diisopropylbenzene], benzoyl peroxide, 2,4-dichlorobenzoyl peroxide, 1,1-bis(t-butylperoxy)3,3,5-trimethylcyclohexane, 2,5-dimethyl-2,5-bis(t-butylperoxy)hexane, 2,5-dimethyl-2,5-bis(t-butylperoxy)hexyne-3, methylethyl ketone peroxide, cyclohexanone peroxide, cumene hydroperoxide, pinane hydroperoxide, p-menthane hydroperoxide, t-butyl hydroperoxide, di-t-butyl peroxide and n-butyl 4,4-bis(t-butylperoxy)valerate. The most preferred peroxide curative is dicumyl peroxide. From 1 to about 10 phr of peroxide are utilized.

The hose also includes a layer of tensioned reinforcement (5). Such reinforcement (5) is known to those skilled in the art and may consist of spiraled, woven, knitted, cabled or braided reinforcement, although a braided reinforcement is preferred. Such reinforcements are typically derived from yarns or cords of cotton, polyester, nylon, metal, rayon or aramid, although polyester yarn is preferred. When the reinforcement is metal, it may be steel, brass-coated steel, zinc-coated or galvanized steel. The reinforcement (5) is preferably spirally wound or braided under sufficient tension to improve the strength of the hose structure.

The hose also includes an elastomeric cover (7). This cover (7) may be extruded or spirally wrapped over the underlying layer, which may be the tensional reinforcement layer (5) or, as discussed below, various other optional layers. The elastomers which may be used to form the cover for the hose of the present invention include those known to those skilled in the art such as chlorosulfonated polyethylene, chlorinated polyethylene, alkylated chlorosulfonated polyethylene, acrylonitrile-butadiene rubber/PVC blends, epichlorohydrin, EPDM, chloroprene, EVA and EVM. Preferably, the elastomer used in the cover is chlorosulfonated polyethylene, chlorinated polyethylene, or alkylated chlorosulfonated polyethylene. The thickness of the elastomeric cover (5) depends upon the desired properties of the hose and the elastomer that is used. Generally speaking, the thickness of the elastomeric cover (5) will range from about 0.5 mm to about 4.0 mm, with a range of from 1.0 mm to being 2.5 mm being preferred.

Whereas the innermost layer, reinforcement layer and elastomer cover layer have been discussed above as essential to the present invention, the hose of the present invention may have optional features. For example, a barrier layer may be incorporated into the hose and directly dispersed on the outside of the innermost layer. Such barrier layer may comprise one or more layers of films. Representative examples of such polymer which may be in film form include low density polyethylene, linear low density polyethylene, high density polyethylene, copolymer polypropylene, homopolymer polypropylene and mixtures thereof. Additional materials which may be used as the film include fluoroplastics and fluoropolymers including, for example, the TEFLON® and TEFZEL® family of fluoroplastics and fluoropolymers such as TEFLON PTFE (polytetrafluoroethylene), TEFLON FEP (fluorinated ethylene-propylene), TEFLON PFA (perfluoroalkoxy), TEFLON AF and TEFZEL polymers. Yet another material which may be used as a barrier layer includes a terpolymer derived from tetrafluoroethylene, herafluoro-propylene and vinylidine fluoride (THV). THV is commercially available from the 3M Company under the designations THV 200, THV 300, THV 400 and THV 500. The thickness of such barrier layer (14) may range of from about 0.025 to 0.30 mm, with a thickness of from 0.1 to 0.2 mm being preferred.

Dispersed on the outside of the barrier layer may be a layer of another polymer. The polymer may comprise the same composition as is used in the innermost layer. The thickness of this layer which directly interfaces with a barrier layer may vary. Generally speaking, the thickness of this first layer (16) will range of from about 0.2 mm to about 4.0 mm with a range of from about 0.4 mm to about 0.8 mm being preferred.

In accordance with another embodiment, the hose may comprise the innermost layer, a first intermediate elastomeric layer, the tensioned reinforcement layer, a second intermediate elastomeric layer and the elastomeric cover. The elastomeric layers promote adhesion between the layers, hose consolidation, strength and flexibility. Conventional elastomers which may be used in these two layers include, but are not limited to EPDM, natural rubber, styrene-butadiene rubber, styrene butyl acrylate rubber, chlorosulfonated polyethylene, chlorinated polyethylene, acrylonitrile-butadiene rubber/PVC blends, epichlorohydrin, chloroprene, EVA, EVM as well as mixtures of two or more of the above polymers. In a preferred embodiment, the composition of the first intermediate layer and second intermediate layer is different from the composition used in the elastomeric cover. The first intermediate elastomeric layer and second elastomeric layer may range in thickness of from 0.1 to 3.0 mm.

The reinforcement useful in the present invention is generally a spiraled, woven, knitted, cabled or braided reinforcement, although a braided reinforcement is preferred. Such reinforcements are typically derived from cotton, polyester, nylon, metal, rayon or aramid, although polyester is preferred. In one embodiment, a braided polyester reinforcement is used. The reinforcement is treated with an RFL (resorcinol-formaldehyde-latex) dip prior to incorporation into the hose.

In a treatment step, polyester yarn is dipped in an RFL liquid. The adhesive composition is comprised of (1) resorcinol, (2) formaldehyde and (3) a halogenated polyolefin rubber latex, and optionally (4) a blocked isocyanate. The resorcinol reacts with formaldehyde to produce a resorcinol-formaldehyde reaction product. This reaction product is the result of a condensation reaction between a phenol group on the resorcinol and the aldehyde group on the formaldehyde. Resorcinol resoles and resorcinol-phenol resoles, whether formed in situ within the latex or formed separately in aqueous solution, are considerably superior to other condensation products in the adhesive mixture.

The resorcinol may be dissolved in water to which around 37 percent formaldehyde has been added together with a strong base such as sodium hydroxide. The strong base should generally constitute around 7.5 percent or less of the resorcinol, and the molar ratio of the formaldehyde to resorcinol should be in a range of from about 1.5 to about 2. The aqueous solution of the resole or condensation product or resin is mixed with the chlorosulfonated polyethylene latex. The resole or other mentioned condensation product or materials that form said condensation product should constitute from 5 to 40 parts and preferably around 10 to 25 parts by solids of the latex mixture. The condensation product forming the resole or resole type resin forming materials should preferably be partially reacted or reacted so as to be only partially soluble in water. Sufficient water is then preferably added to give around 12 percent to 18 percent by weight overall solids in the final dip. The weight ratio of the polymeric solids from the latex to the resorcinol/formaldehyde resin should be in a range of about 5 to about 7.

Chlorinated polyethylene starting materials suitable for use in the latex include, but are not limited to, finely-divided particles which typically meet four physical property criteria. First, the materials have a weight average molecular weight of from about 40,000 to about 300,000. Second, the materials have a chemically combined chlorine content of from about 20 to about 48 percent by weight of polymer. Third, the materials have a 100 percent modulus, measured in accordance with ASTM Test D-412, from about 0.5 to about 4.8 MPa. Fourth, the materials have a heat of fusion of from about 0 to about 15 calories per gram, preferably from about 0 to about 10 calories per gram. Commercially available chlorinated polyethylenes that are suitable for use in the present invention include, but are not limited to, those obtained from DuPont/Dow under the designation Tyrin®. 3611P and Tyrin® CM0136.

The chlorosulfonated polyethylene useful in the latex includes, but is not limited to, a material having from about 20 to about 48 weight percent chlorine, and from about 0.4 to about 3.0 weight percent sulfur. Typical preparations of chlorosulfonated polyethylene are disclosed in U.S. Pat. Nos. 2,586,363 and 2,503,252. Commercially available chlorosulfonated polyethylene which may be used in the present invention include, but are not limited to, those obtained from E. I. du Pont de Nemours, Inc. under the designation Hypalon®, such as Hypalon® 20, Hypalon® 30, Hypalon® 40, Hypalon® 40 Soft, Hypalon® 4085, Hypalon® 48, and Hypalon® HPG 6525.

The chlorosulfonated polyethylene latex useful in this invention includes latices of the aforementioned Hypalon® materials. Generally, the latices are aqueous dispersions or emulsions of chlorosulfonated polyethylene, containing from about 20 to about 60 percent by weight of chlorosulfonated polyethylene. Alternatively, the latex contains from about 35 to about 45 percent by weight of chlorosulfonated polyethylene.

The RFL adhesive generally does not include an isocyanate. Alternatively, the RFL adhesive may include a blocked isocyanate. In one embodiment from about 1 to about 20 parts by solid of blocked isocyanate is added to the adhesive. The blocked isocyanate may be any suitable blocked isocyanate known to be used in RFL adhesive dips, including but not limited to, caprolactam blocked methylene-bis-(4-phenylisocyanate), such as Grilbond-IL6 available from EMS American Grilon, Inc., and phenolformaldehyde blocked isocyanates as disclosed in U.S. Pat. Nos. 3,226,276, 3,268,467; and 3,298,984, the three of which are fully incorporated herein by reference. As a blocked isocyanate, use may be made of reaction products between one or more isocyanates and one or more kinds of isocyanate blocking agents. The isocyanates include monoisocyanates such as phenyl isocyanate, dichlorophenyl isocyanate and naphthalene monoisocyanate, diisocyanate such as tolylene diisocyanate, dianisidine diisocyanate, hexamethylene diisocyanate, m-phenylene diisocyanate, tetramethylene diisocyante, alkylbenzene diisocyanate, m-xylene diisocyanate, cyclohexylmethane diisocyanate, 3,3-dimethoxyphenylmethane-4,4'-diisocyanate, 1-alkoxybenzene-2,4-diisocyanate, ethylene diisocyanate, propylene diisocyanate, cyclohexylene-1,2-diisocyanate, diphenylene diisocyanate, butylene-1,2-diisocyanate, diphenylmethane-4,4diisocyanate, diphenylethane diisocyanate, 1,5-naphthalene diisocyanate, etc., and triisocyanates such as triphenylmethane triisocyanate, diphenylmethane triisocyanate, etc. The isocyanate-blocking agents include phenols such as phenol, cresol, and resorcinol, tertiary alcohols such as t-butanol and t-pentanol, aromatic amines such as diphenylamine, diphenylnaphthylamine and xylidine, ethyleneimines such as ethylene imine and propyleneimine, imides such as succinic acid imide, and phthalimide, lactams such as $\epsilon$.-caprolactam, $\delta$-valerolactam, and butyrolactam, ureas such as urea and diethylene urea, oximes such as acetoxime, cyclohexanoxime, benzophenon oxime, and $\alpha$-pyrolidon.

Other additives may be included in the RFL including curatives and antidegradants as are known in the art. In one preferred embodiment, zinc containing additives are not used.

It is normally preferable to first prepare the polymer latex and then add the partially condensed condensation product. However, the ingredients (the resorcinol and formaldehyde) can be added to the polymer latex in the uncondensed form, and the entire condensation can then take place in situ. The latex tends to keep longer and be more stable if it is kept at an alkaline pH level.

In accordance with this invention, the yarn is dipped in the RFL dip and dried at a temperature within the range of about 75° C. to about 265° C. for about 0.5 minutes to about 20 minutes, and thereafter calendered into the rubber and cured therewith. The drying step utilized will preferably be carried out by passing the cord through 2 or more drying ovens which are maintained at progressively higher temperatures. For instance, it is highly preferred to dry the yarn by passing it through a first drying oven which is maintained at a temperature of about 250° F. (121° C.) to about 300° F. (149° C.), and then to pass it through a second oven which is maintained at a temperature which is within the range of about 350° F. (177° C.) to about 500° F. (260° F.). It should be appreciated that these temperatures are oven temperatures rather than the temperature of the yarn being dried. The yarn will preferably have a total residence time in the drying ovens which is within the range of about 1 minute to about 5 minutes. For example, a residence time of 30 seconds to 90 seconds in the first oven and 30 seconds to 90 seconds in the second oven could be employed.

After treatment of the reinforcement in the RFL, the treated yarn is incorporated into the hose by spiraling or braiding using methods as are known in the art.

Figure 2:
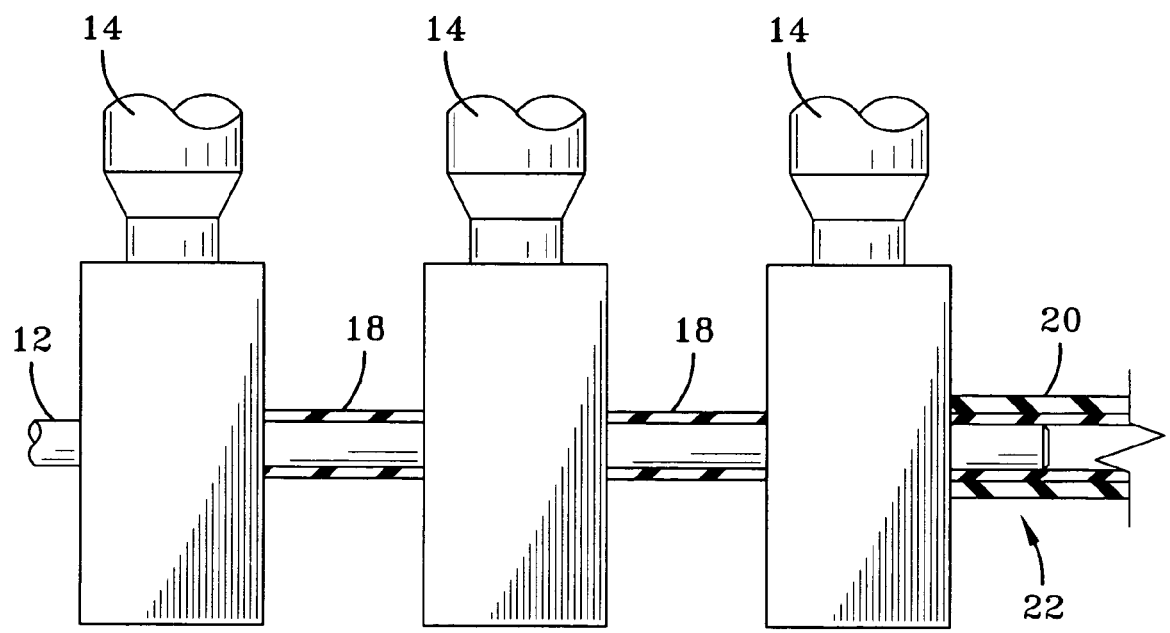
FIG. 2 illustrates the construction of the hose assembly.
Figure 3:
FIG. 3 illustrates steps in the construction of the finite hose length.
Figure 4:
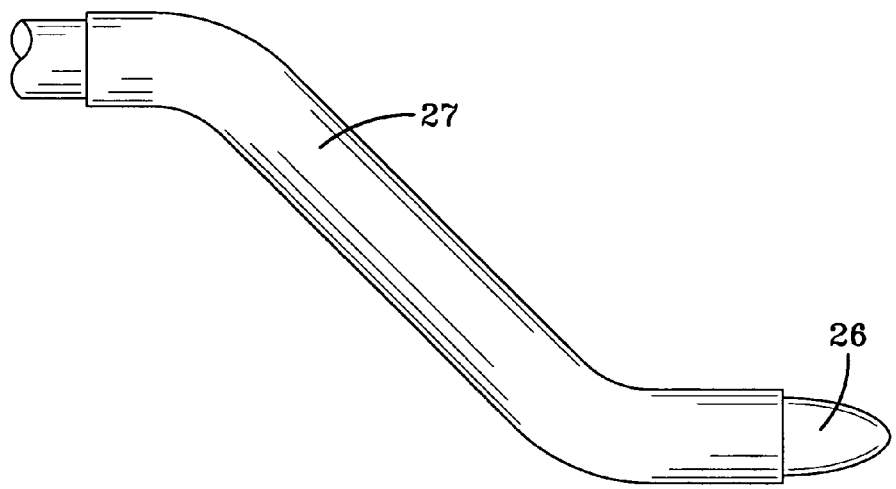
FIG. 4 illustrates a finite hose length on a fixed mandrel.
Figure 5:
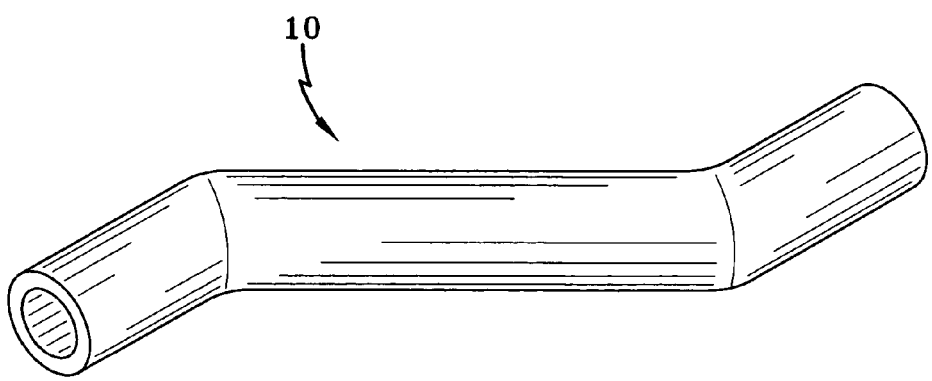
FIG. 5 illustrates a cured curved hose.

An embodiment of the method of producing a curved hose is now illustrated with reference to FIGS. 2-5. FIG. 2 illustrates the first phase of the inventive manufacturing process for producing curved hose (10). A flexible mandrel (12) is fed into an extruder (14) wherein a hose innermost layer (16) is extruded over the mandrel (12). By initially forming the hose (10) on a mandrel (12), higher working pressure hoses can be produced, versus other hoses which are not built on a mandrel. While only a single extruder (14) is illustrated, depending upon the engineering specifications of the finished hose (10), the hose innermost layer (16) may be constructed of several extruded layers.

After the innermost layer (16) is formed on the mandrel (12), reinforcement (18) as yarn treated with the RFL as disclosed herein is applied to the outer surface of the innermost layer (16). The reinforcement (18) may be spirally wound or braided onto the innermost layer (16), although braiding is preferred. A cover layer (20) is then extruded over the reinforced innermost layer (16). One skilled in the art would readily appreciate that multiple layers of reinforcement (18) may be applied to the core (16), as well as required friction layers between the innermost layer (16) and the reinforcement layer (18). Any conventional material, such as aramid, polyester, nylon, cotton, glass, or steel, may be used as the reinforcement (18), although polyester is preferred.

After the hose assembly (22) is complete, and while the hose assembly (22) is still on the flexible mandrel (12), the hose assembly (22) may optionally be partially cured. Conventional hose curing techniques, such as steam curing and continuous curing, may be used to achieve the partial curing. Alternatively and preferentially no partial curing is used, but instead the uncured hose assembly is removed from the mandrel and cut.

After assembly and the optional partial curing, the mandrel (12) is removed from within the partially-cured hose assembly. The mandrel (12) may be removed by hand or by mechanical automated means. Removal of the mandrel (12) is preferably achieved by mechanical means to reduce the labor required to produce the hose (10).

The hose assembly is then cut into finite lengths equivalent to the final length of the curved hose (10) required by the engineering specification for the curved hose (10). As hose lengths differ depending upon the desired end use of the hose (10), the indefinite partially-cured hose assembly may be cut into a variety of lengths.

The cut hose assemblies (24) are then inserted onto a rigid mandrel (26). The configuration of the rigid mandrel (26) corresponds to the desired configuration of the cured hose (10). Typically, sets of mandrels (26) are mounted on a moveable rack. A cut hose length (24) is inserted onto each mandrel (26) on the moveable rack. The mandrels (26) are then placed in a vulcanization chamber to complete the curing of the cut hose lengths (24). Alternatively, the cut hose may be shaped into curved shapes by placing the cut hose onto a shaped mold and curing in a heated press.

In one embodiment, the cut hose length (24) on the mandrel (26) is cured in a steam autoclave or other steam curing device as is known in the art. As is also known in the art, elastic band-type constriction devices may optionally be used to end cap the cut hose assembly (24) at each end to prevent steam migration into the hose ends during cure. Such elastics may include rubber bands, o-rings, elastic tubing, and the like. Alternatively and preferentially, elastic band type constriction devices are not used during cure.

After curing has been completed, the curved hose shapes (10), while still on the mandrel (12), are preferably cooled in a water bath. The water bath also acts as a cleaning step for both the mandrel (26) and the curved hose shapes (10). The hoses (10) are then removed from the mandrel (26). The finished curved hose (10) is ready for shipment.

By using the inventive process for manufacturing curved hose (10), the high manual labor required to produce a curved hose (10) is reduced in comparison to the known conventional methods of production. In particular, the elimination of the use of elastic end caps reduces the labor involved in the application of the end caps, as well as the added labor in mounting the constricted hoses onto the shaped mandrels. Elimination of a preliminary partial cure step before cutting the hose reduces production time and the associated added expense. The inventive method also eliminates the step of trimming the hose edges as done with conventionally manufactured curved hose, reducing waste in the hose production.

It has been surprisingly and unexpectedly observed that curved hose made using the RFL adhesive with chlorosulfonated polyethylene and no end-capping elastics results in adhesion between the cover and reinforcement approximately twice that of hoses made similarly, but without the RFL with chlorosulfonated polyethylene. Adhesion between the cover and polyester reinforcement is improved, as well as that between the polyester reinforcement and innermost layer. Elimination of the use of elastic end caps is particularly advantageous. The presence of the elastic end caps complicates the loading of the cut hose assembly (24) onto the mandrel (26), due to constriction of the hose diameter by the elastic bands. The bands also create indentations in the hose ends, resulting in the need to trim the hoses.

It has also been surprisingly and unexpectedly observed that the use of the RFL adhesive with chlorosulfonated polyethylene results in sufficient adhesion that precure of the hose assembly prior to mounting of the cut hose on the mandrel is unnecessary. While not wishing to be bound by any theory, it is believed that the presence of the chlorosulfonated polyethylene on the surfaces of the reinforcement increases the adhesion of the reinforcement to the rubber sufficiently to prevent disruption of the hose during mounting on the shaped mandrels. The RFL treatment with chlorosulfonated polyethylene also apparently resists adhesion degradation due to steam migration between the hose layers during curing, eliminating the need for elastic endcaps.

While certain representative embodiments and details have been shown for the purpose of illustrating the subject invention, it will be apparent to those skilled in this art that various changes and modifications can be made therein without departing from the scope of the subject invention.

What is claimed is:

1. A method for manufacturing a curved hose, the method comprising the steps of:
    (a) forming a hose assembly, the hose assembly comprising:
        (i) an innermost layer of chlorinated polyethylene rubber;
        (ii) a polyester reinforcement overlaying the innermost layer, the reinforcement having disposed on its surface an RFL adhesive comprising a chlorosulfonated polyethylene rubber; and
        (iii) an elastomeric cover overlaying the reinforcement;
    (b) cutting the hose assembly into hose lengths;
    (c) shaping the hose lengths into predetermined curved hose shapes; and
    (d) curing the curved hose shapes.

2. The method of claim 1, wherein the polyester reinforcement is braided or spiraled yarn.

3. The method of claim 1, wherein the polyester reinforcement is braided yarn.

4. The method of claim 3, wherein said braided polyester is not treated with an isocyanate.

5. The method of claim 1, wherein the polyester reinforcement is yarn treated with the RFL adhesive comprising a chlorosulfonated polyethylene rubber.

6. The method of claim 5, wherein the RFL adhesive comprises from about 12 to about 18 percent by weight of chlorosulfonated polyethylene and resorcinol/formaldehyde resin, with the weight ratio of the polymeric solids from the latex to the resorcinol/formaldehyde resin is in a range of about 5 to about 7.

7. The method of claim 1, excluding a step of partially curing the hose assembly prior to the step of curing the curved hose shapes.

8. The method of claim 1, wherein during said step of curing the curved hose shapes, the hose shapes are not end-capped.

9. The method of claim 1, wherein said curved hose shapes are steam cured.

10. The method of claim 1, wherein the hose assembly is formed on a linear mandrel.

11. The method of claim 1, wherein the hose lengths are shaped on a heated press.

12. The method of claim 1, wherein the hose lengths are shaped by insertion onto a shaped mandrel.

13. The method of claim 1, wherein the RFL does not include zinc.

14. The method of claim 1, further comprising the step of partially curing the hose assembly prior to the step of cutting the hose assembly into hose lengths.

15. A method for manufacturing a curved hose, the method comprising the steps of:
    (a) forming a hose assembly, the hose assembly comprising:
        (i) an innermost layer of chlorinated polyethylene rubber;
        (ii) a polyester reinforcement overlaying the innermost layer, the polyester reinforcement having disposed on its surface an RFL adhesive comprising a chlorosulfonated polyethylene rubber, wherein said polyester reinforcement is not treated with an isocyanate, and wherein the RFL does not include zinc; and
        (iii) an elastomeric cover overlaying the reinforcement;
    (b) cutting the hose assembly into hose lengths;
    (c) shaping the hose lengths into predetermined curved hose shapes; and
    (d) curing the curved hose shapes, wherein during said curing the hose shapes are not end-capped.

16. A method for manufacturing a curved hose, the method comprising the steps of:
    (a) forming a hose assembly, the hose assembly comprising:
        (i) an innermost layer of chlorinated polyethylene rubber;
        (ii) a polyester reinforcement overlaying the innermost layer, the polyester reinforcement having disposed on its surface an RFL adhesive comprising a chlorosulfonated polyethylene rubber, wherein said polyester reinforcement is not treated with an isocyanate, and wherein the RFL does not include zinc; and
        (iii) an elastomeric cover overlaying the reinforcement;
    (b) cutting the hose assembly into hose lengths;
    (c) shaping the hose lengths into predetermined curved hose shapes; and
    (d) curing the curved hose shapes exclusive of partially curing the hose assembly prior to the curing the curved hose shapes, wherein during said curing the hose shapes are not end-capped.

* * * * *